United States Patent
Hayashi et al.

(10) Patent No.: US 6,862,907 B2
(45) Date of Patent: Mar. 8, 2005

(54) ELECTRONIC STEERING LOCK MECHANISM

(75) Inventors: Masaki Hayashi, Aichi (JP); Hirokazu Shamoto, Aichi (JP); Masaki Yoshino, Aichi (JP); Toshihiro Nagae, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/465,991

(22) PCT Filed: Feb. 8, 2002

(86) PCT No.: PCT/JP02/01113

§ 371 (c)(1),
(2), (4) Date: Jun. 27, 2003

(87) PCT Pub. No.: WO02/062635

PCT Pub. Date: Aug. 15, 2002

(65) Prior Publication Data

US 2004/0050120 A1 Mar. 18, 2004

(30) Foreign Application Priority Data

Feb. 9, 2001 (JP) ....................................... 2001-033891

(51) Int. Cl.[7] .............................. B06R 25/02; G05G 5/00
(52) U.S. Cl. ............................................ 70/186; 70/182
(58) Field of Search ................................... 70/182–186

(56) References Cited

U.S. PATENT DOCUMENTS 3,680,335 A * 8/1972 Onishi .......................... 70/252
3,688,861 A * 9/1972 Lipschultz et al. .......... 180/287
3,791,182 A * 2/1974 Oxley et al. .................. 70/252
4,250,976 A * 2/1981 Mochida ...................... 180/271
4,552,000 A * 11/1985 Lipschutz ...................... 70/185
6,295,848 B1 * 10/2001 Suzuki .......................... 70/186
6,298,938 B1 * 10/2001 Klaiber et al. .............. 180/287
6,354,120 B1 * 3/2002 Tan et al. ...................... 70/252
6,442,985 B1 * 9/2002 Watanuki et al. .............. 70/186
6,539,756 B2 * 4/2003 Bartels et al. ................ 70/186
6,647,751 B2 * 11/2003 Zillmann ...................... 70/186

FOREIGN PATENT DOCUMENTS

| DE | 10039839 A1 * | 5/2002 | ........... B06R/25/02 |
| JP | 1-150170 U | 10/1989 | |
| JP | 2-125871 U | 10/1990 | |
| JP | 8-324386 A | 12/1996 | |
| WO | WO 98/33686 A1 | 8/1998 | |

* cited by examiner

Primary Examiner—John B. Walsh
(74) Attorney, Agent, or Firm—Crompton, Seager & Tufte, LLC

(57) ABSTRACT

An electronic steering wheel lock apparatus having high reliability. The electronic steering wheel lock apparatus (11) includes a lock pin (12) for locking a steering shaft (21). The lock pin (12) is moved by a motor or a plate cam (41). When an engine is activated and the steering shaft is unlocked, a solenoid (31) is engaged with the plate cam (41) to restrict the movement of the plate cam (41).

11 Claims, 9 Drawing Sheets

ELECTRONIC STEERING LOCK MECHANISM

BACKGROUND OF THE INVENTION

The present invention relates to an automobile steering wheel lock mechanism, and more particularly, to an electronic steering wheel lock mechanism.

A mechanical steering wheel lock apparatus is widely used in the prior art to prevent a vehicle from being stolen.

In one example, referring to FIG. 9, a steering wheel lock apparatus 51 includes a key cylinder 54 and a lock pin 52. When a driver operates a mechanical key (not shown), the key cylinder 54 is rotated to actuate the lock pin 52. The lock pin 52 engages a steering shaft 53 and the rotations of the steering shaft 53 and a steering wheel (not shown) are prohibited.

However, nowadays, electronic keys are replacing the conventional mechanical keys. Therefore, it is predicted that an electronic steering wheel lock apparatus, which has an actuator, such as a motor, to electronically actuate the key cylinder 54, will be widely used in the future.

However, in an electronic steering wheel lock apparatus, electric noise may cause an ECU to function erroneously. Such erroneous functioning may rotate a motor when not required and engage a locking means with a steering shaft. That is, there is a potential problem in that the electronic steering wheel lock mechanism may not function normally.

BRIEF SUMMARY OF THE INVENTION

It is an object of the present invention to provide an electronic steering wheel lock mechanism having high reliability.

A first perspective of the present invention provides a lock mechanism for a steering shaft responsive to an operation of a starting means in a vehicle. The lock mechanism includes a locking means for selectively locking the steering shaft, a first actuator for moving the locking means, and a second actuator for engaging the first actuator and restricting the movement of the first actuator. The second actuator is disengaged from the first actuator in response to the operation of the starting means to enable the movement of the first actuator.

A second perspective of the present invention provides a lock mechanism for a steering shaft. The lock mechanism includes a locking means for selectively locking a steering shaft, an urging means for urging the locking means in a direction that releases the locking of the locking means, a first actuator for moving the locking means against the force of the urging means, and a second actuator for engaging the first actuator and restricting the movement of the first actuator. The second actuator enables the movement of the first actuator by disengaging the first actuator when the locking means unlocks the steering shaft.

A third perspective of the present invention provides a lock mechanism for a steering shaft. The lock mechanism includes a locking means for selectively locking the steering shaft, a first actuator for moving the locking means, and a second actuator for restricting the movement of the first actuator by engaging the first actuator when the locking means unlocks the steering shaft.

BRIEF DESCRIPTION OF THE DRAWINGS

The invention, together with objects and advantages thereof, may best be understood by reference to the accompanying drawings in which.

DETAILED DESCRIPTION OF THE PREFERRED EMBODIMENTS

An automobile electronic steering wheel lock mechanism according to one embodiment of the present invention will now be described with reference to FIGS. 1 to 7.

Referring to FIGS. 1 to 4, an electronic steering wheel lock apparatus 11, which has an electronic steering wheel lock mechanism, is installed in a steering post (not shown). The electronic steering wheel lock apparatus 11 has a box-like case body 10. The case body 10 includes a lock body 13 and a cover 19, which is attached to the lock body 13.

Figure 2:
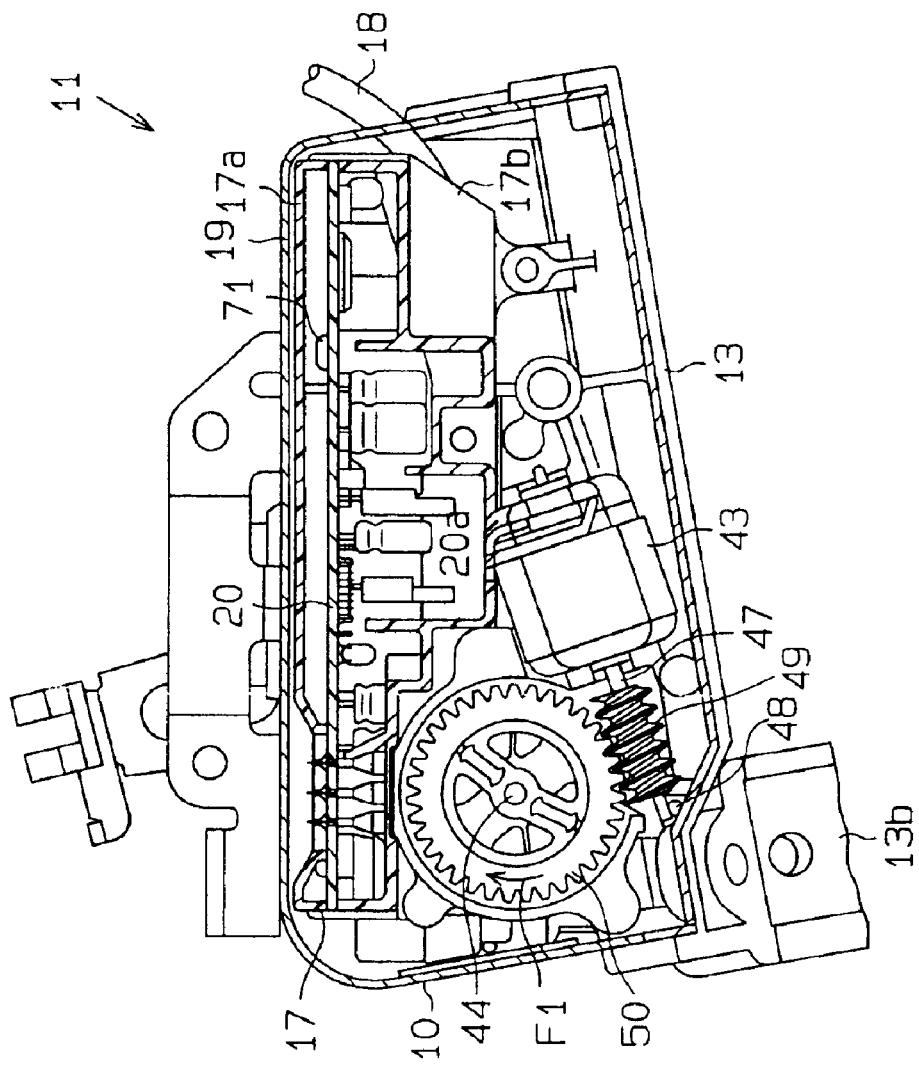
FIG. 2 is a cross-sectional view of the electronic steering wheel lock apparatus taken along line 2—2 in FIG. 1.
Figure 3:
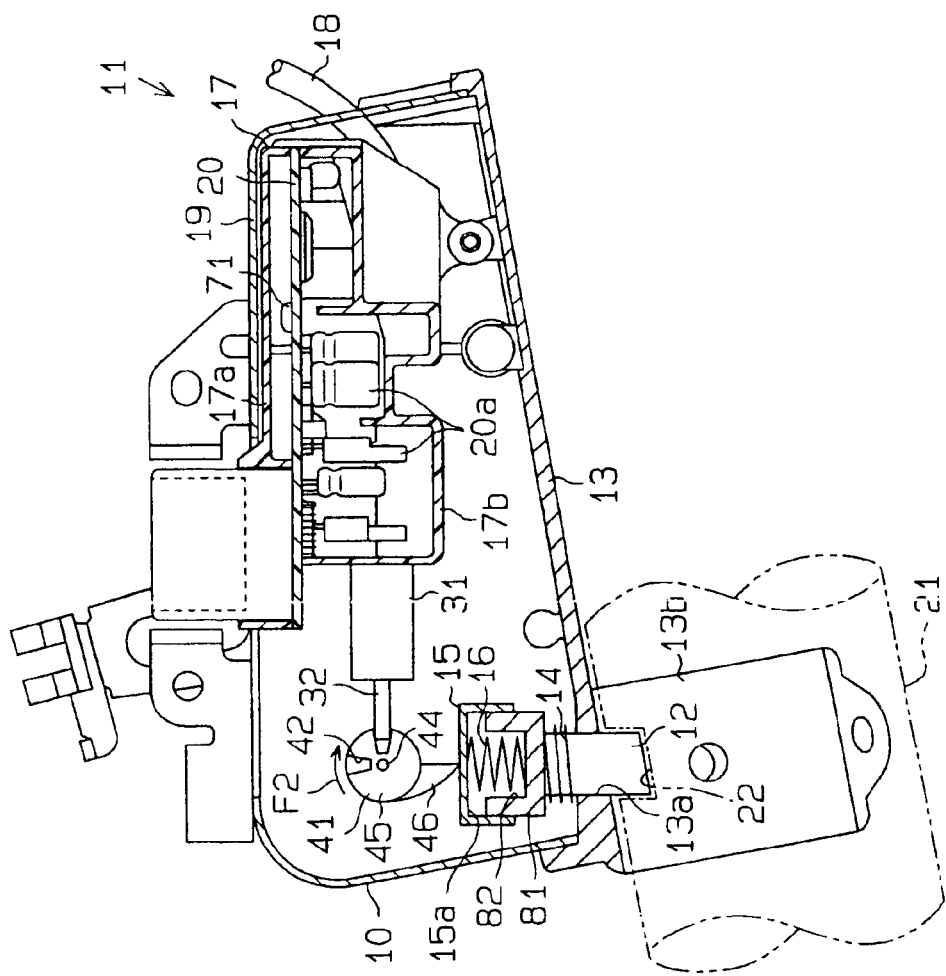
FIG. 3 is a cross-sectional view of the electronic steering wheel lock apparatus taken along line 3—3 in FIG. 1.

As shown in FIGS. 2 and 3, a retaining case 17, which is made of synthetic resin, is arranged on an inner surface of the cover 19. The retaining case 17 is formed by joining a first case 17a and a second case 17b. A printed circuit board 20 is retained in the retaining case 17. The printed circuit board 20 is fixed to the second retaining case 17b by a screw 71. Electronic devices 20a, such as an IC and a capacitor, are mounted on the printed circuit board 20. Further, an electric wire 18, one end of which extends out of the case body 10, is electrically connected to the printed circuit board 20.

Figure 1:
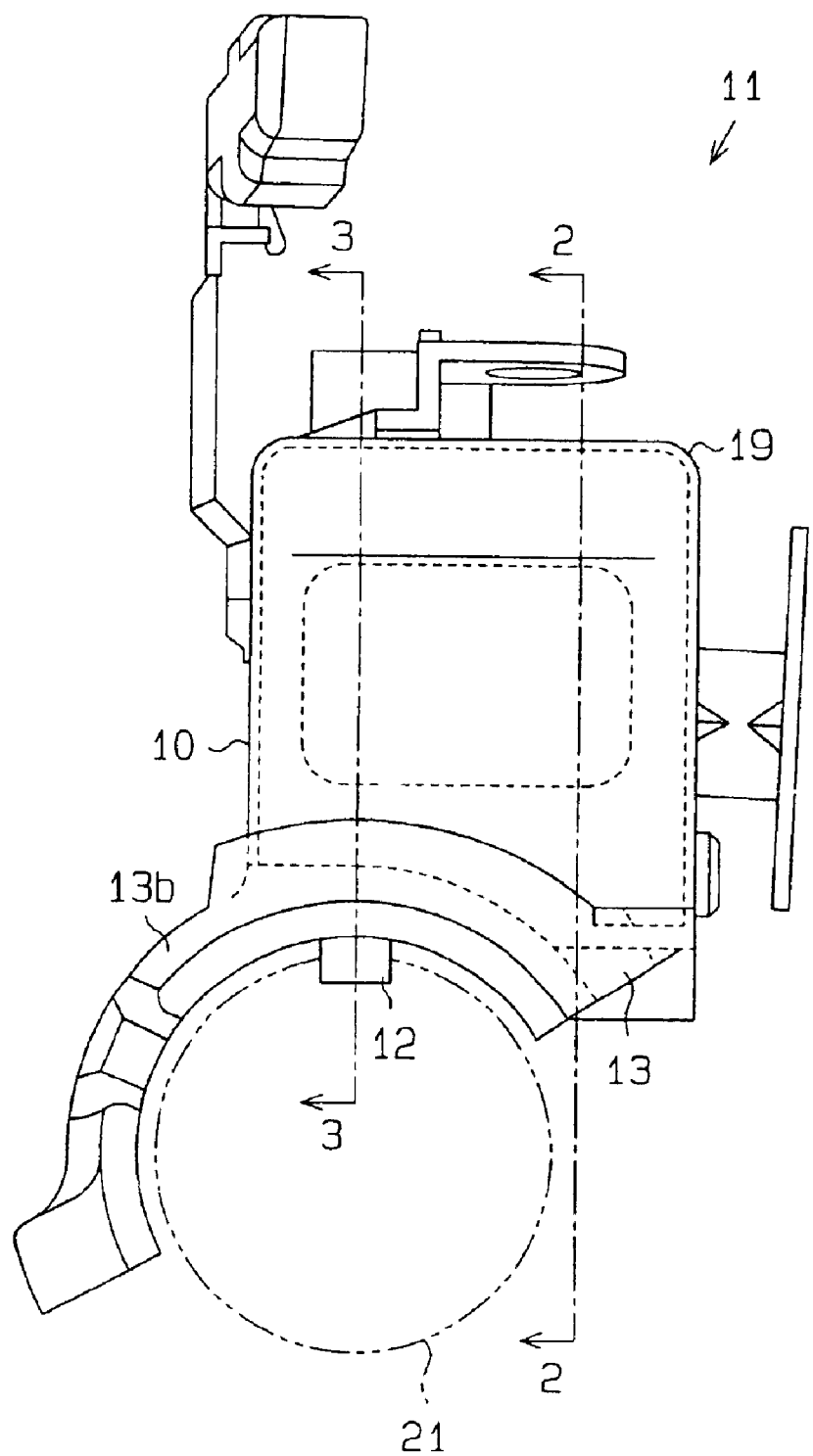
FIG. 1 is a side view of an electronic steering wheel lock apparatus according to one embodiment of the present invention.

As shown in FIG. 1, a generally arcuate coupling portion 13b extends from the lock body 13. The coupling portion 13b is coupled to a column tube (not shown) by a bolt (not shown). A steering shaft 21 is inserted through the column tube.

Figure 4:
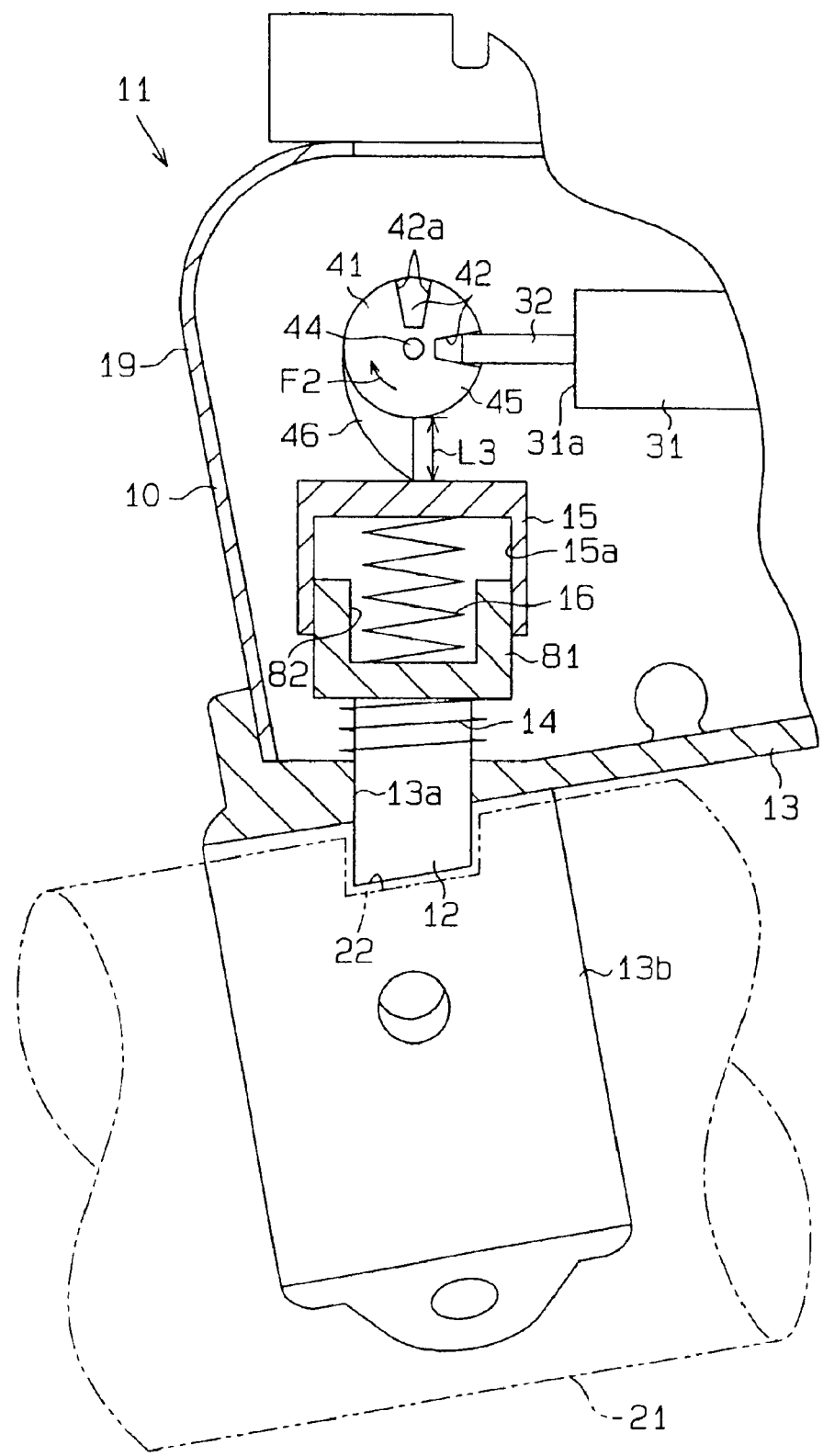
FIG. 4 is a cross-sectional view showing a main portion of the electronic steering wheel lock apparatus in FIG. 1.

A socket 22 is formed in the outer surface of the steering shaft 21. As shown in FIGS. 3 and 4, the lock body 13 has a guide hole 13a. The guide hole 13a is formed at a position corresponding to the coupling portion 13b. When the case body 10 is attached to the column tube, the guide hole 13a is communicated with the interior of the column tube.

Referring to FIGS. 3 and 4, a lock pin 12, which serves as a locking means, is movably arranged in the guide hole 13a. The distal portion of the lock pin 12 projects from and retracts into the outer surface of the lock body 13. The lock pin 12 is box-like and has a generally rectangular cross section. The cross-sectional area of the lock pin 12 is smaller than the cross-sectional area of the guide hole 13a. The distal end of the lock pin 12 may be engaged with and disengaged from the socket 22.

A spring holder 81, which has generally U-shaped cross-section, is connected to the proximal end of the lock pin 12. A lock pin spring 14, which serves as an urging means, is arranged between the spring holder 81 and the lock body 13. The lock pin spring 14 urges the lock pin 12 in a direction, in which the lock pin 12 moves away from the socket 22 (disengaging direction).

A first seat 82 is defined in the surface of the spring holder 81 that is opposite side to the lock pin 12. The spring holder 81 includes a spring cover 15, which has a generally U-shaped cross-section, to cover the first seat 82. The spring cover 15 includes a second seat 15a, which is opposed to the first seat 82. The inner sidewalls of the second seat 15a slide along the outer side walls of the first seat 82. A cam spring 16 is accommodated between the first seat 82 and the second seat 15a. The cam spring 16 urges the lock pin 12 in a direction, in which the lock pin 12 engages the socket 22. The spring coefficient of the cam spring 16 is greater than the spring coefficient of the lock pin spring 14.

As shown in FIGS. 3 and 4, a solenoid 31 is retained in the case body 10. A plunger 32 of the solenoid 31 projects from an end surface 31a of the solenoid and moves in the longitudinal direction of the solenoid 31. The plunger 32 moves in a direction perpendicular to the moving direction of the lock pin 12. When the solenoid 31 is energized, the plunger 32 moves in a retracting direction (right direction, as viewed in FIG. 4). When the solenoid 31 is not energized, the plunger 32 moves in a projecting direction (left direction, as viewed in FIG. 4).

As shown in FIG. 2, a motor 43 is retained in the case body 10. The motor 43 has a first shaft 47, the distal end of which contacts a slide pin 48. The slide pin 48 is used to position the first shaft 47. A worm gear 49 is attached to the first shaft 47. The worm gear 49 is meshed with a spur gear 50, which is attached to a second shaft 44, to drive the spur gear 50. The spur gear 50 rotates about the second shaft 44 only in a clockwise direction in FIG. 2 (the direction indicated by arrow F1).

As shown in FIGS. 3 and 4, a plate cam 41 is attached to the second shaft 44. The plate cam 41 is located in the proximity of the plunger 32 of the solenoid 31. The plate cam 41 rotates about the second shaft 44 only in the clockwise direction of FIGS. 3 and 4 (the direction indicated by arrow F2). That is, the plate cam 41 rotates only in the same direction as the spur gear 50. The plunger 32 pushes the periphery of the plate cam 41.

Figure 6:
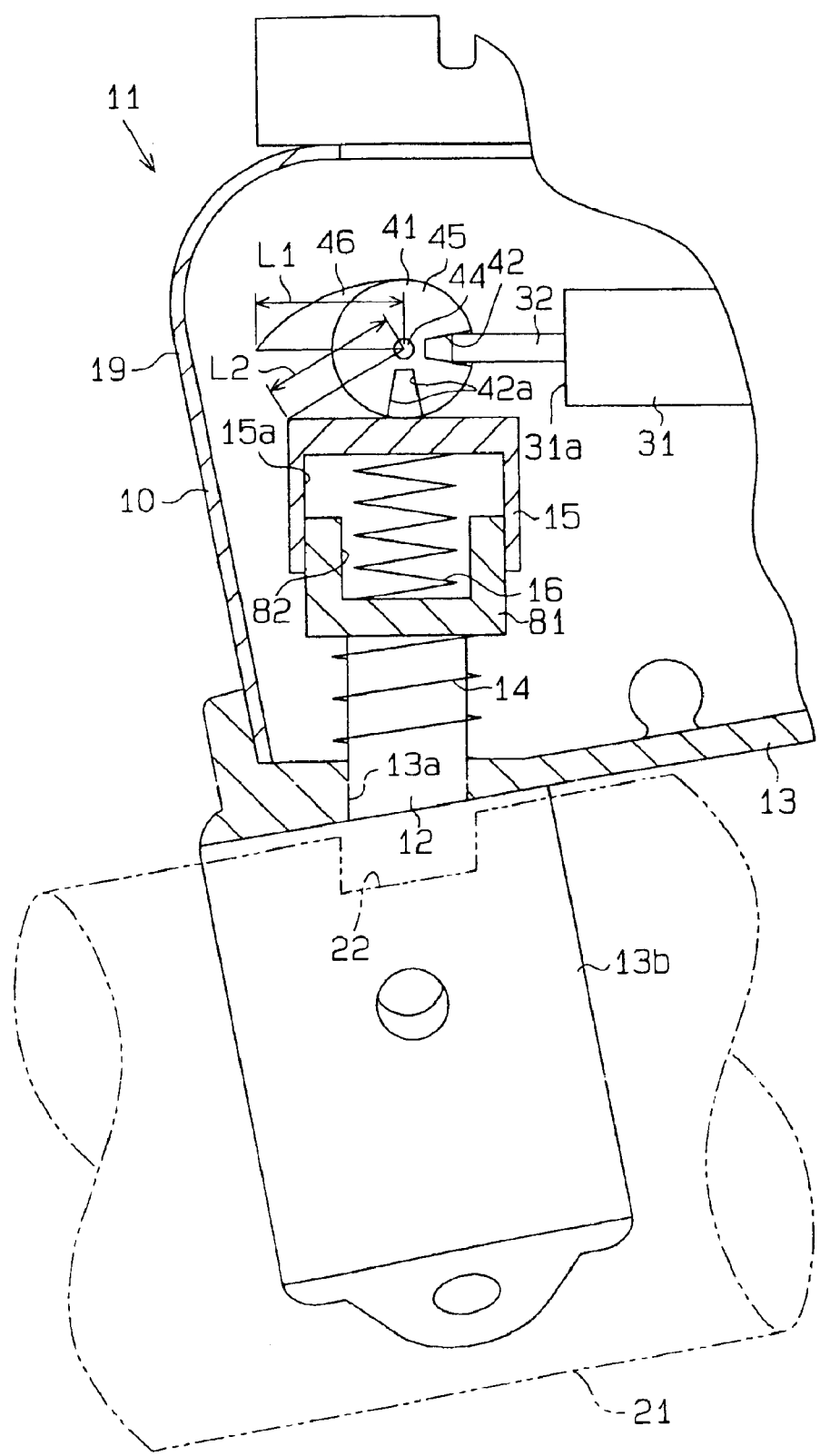
FIG. 6 is a cross-sectional view showing a main portion in a state in which a lock pin is in a disengaged state.

The plate cam 41 includes a stopper 46 and a rotating portion 45. The stopper 46 protrudes outward from the periphery of the rotating portion 45. Referring to FIG. 4, the protruding length L3 of the stopper 46 is greater than the distance from the end surface 31a of the solenoid 31 to the periphery of the rotating portion 45. The stopper 46 includes a first arcuate side and a second linear side. The second side extends in a radial direction of the second shaft 44. Referring to FIG. 6, the distance L1 from the center of the second shaft 44 to the distal end of the stopper 46 is greater than the length L2 from the center of the second shaft 44 to an edge of the outer surface of the spring cover 15 that the plate cam 41 contacts. That is, even if the plate cam 41 rotates in the opposite direction of arrow F2, the stopper 46 hits the spring cover 15 and restricts the rotation of the plate cam 41.

As shown in FIGS. 3 and 4, the rotating portion 45 is generally disk-like. The second shaft 44 is arranged at the center of the rotating portion 45. The rotating portion 45 has two engaging notches 42, which are separated from each other by a predetermined interval. The two engaging notches 42 are each opened in the radial direction of the rotating portion 45. The distance between the two opposing inner surfaces 42a of the engaging notch 42 increases towards the opening end of the engaging notch 42. The distal end of the plunger 32 is engaged with and disengaged from each engaging notch 42. More specifically, when the distal end of the stopper 46 contacts the spring cover 15, the distal end of the plunger 32 is engaged with the first engaging notch 42. In other words, in a locked state, in which the lock pin 12 is engaged with the socket 22, the distal end of the plunger 32 is engaged with the first engaging notch 42. When the periphery of the rotating portion 45 contacts the spring cover 15, the distal end of the plunger 32 is engaged with the second engaging notch 42. In other words, in an unlocked state, in which the lock pin 12 is disengaged from the socket 22, the distal end of the plunger 32 is engaged with the second engaging notch 42. That is, the plate cam 41 is positioned by engaging the distal end of the plunger 32 with each engaging notch 42.

Figure 5:
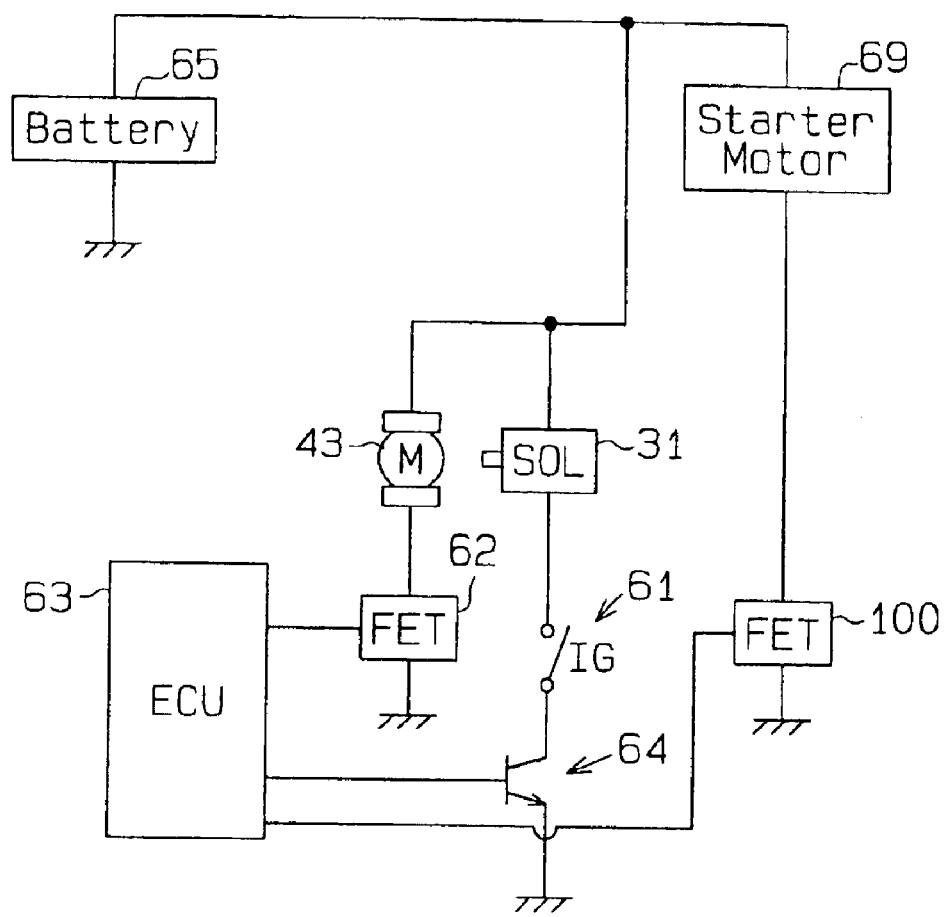
FIG. 5 is a schematic circuit diagram of the electronic steering wheel lock apparatus of FIG. 1.

Referring to FIG. 5, a starter motor 69 is electrically connected to a battery 65. The starter motor 69 is connected to the drain terminal of a field-effect transistor (FET) 100. The gate terminal of the FET 100 is connected to an ECU 63 and the source terminal of the FET 100 is grounded. The ECU 63 controls the FET 100 and supplies power to the starter motor 69 from the battery 65. In this manner, the starter motor 69 is actuated to start an engine.

The motor 43 and the solenoid 31 are electronically connected to the battery 65. The motor 43 is electronically connected to the drain terminal of a FET 62, which serves as a switching device. The gate terminal of the FET 62 is connected to the ECU 63, and the source terminal of the FET 62 is grounded. The FET 62 is activated in response to a drive signal from the ECU 63 to rotate the second shaft 44 of the motor 43 in only one direction. The solenoid 31 is electronically connected to the collector terminal of a transistor 64 via an engine ON-OFF switch 61. The base terminal of the transistor 64 is connected to the ECU 63, and the emitter terminal of the transistor 64 is grounded. The transistor 64 is activated in response to a drive signal from the ECU 63. Simultaneously, the engine ON-OFF switch 61 is activated to actuate the solenoid 31.

The ECU 63 executes various signal processing. More specifically, the ECU 63 receives a transmission signal, which is transmitted from an electronic key that is possessed by a driver, and compares the ID code, which is included in the transmission signal, with a predetermined ID code, which is stored in the ECU 63. When the two ID codes match, the ECU 63 provides a drive signal to the FET 62 and the transistor 64 to activate the FET 62 and the transistor 64. That is, the ECU 63 performs a process to actuate a smart ignition system.

The engine ON-OFF switch 61, which is connected between the solenoid 31 and the transistor 64, selectively energizes the solenoid 31. The engine ON-OFF switch 61 may be manually operated. When the FET 62 and the transistor 64 are activated, the engine ON-OFF switch 61 is manually operated to energize the solenoid 31. As a result, the plunger 32 retracts in the right direction, as viewed in FIG. 4, and the distal end of the plunger 32 is disengaged from the engaging notch 42. This rotates the plate cam 41 to disengage the lock pin 12 from the steering shaft 21. The solenoid 31 is actuated when the engine ON-OFF switch 61 is activated. This prevents the solenoid 31 from functioning erroneously due to the electric noise.

The operation of the electronic steering wheel lock apparatus 11 will now be described.

The ECU 63 compares the ID code, which is included in the transmission signal from the electronic key, with the ID code of the ECU 63 in the state shown in FIG. 4. When the two ID codes match, the ECU 63 provides the drive signal to the FET 62 and the transistor 64 to activate the FET 62 and the transistor 64. This slightly rotates the motor 43 in the direction indicated by arrow F2. Then, when the driver operates the engine ON-OFF switch 61, the solenoid 31 is energized. As a result, the plunger 32 is retracted and disengaged from the notch 42. Simultaneously, the motor 43 rotates in the direction indicated by arrow F1 to rotate the plate cam 41 in the direction indicated by arrow F2. In this state, when the rotation of the plate cam 41 is detected, the ECU 63 deactivates the transistor 64. Therefore, the plunger 32 projects and slides along the outer surface of the rotating plate cam 41 even though the engine ON-OFF switch 61 is maintained in the ON state. This guarantees engagement of the plunger 32 with the second engaging notch 42, as shown in FIG. 6. The lock pin 12 is disengaged from the socket 22 to enable the rotation of the steering shaft 21 and a steering wheel. In this state, the starter motor 69 is actuated to start the engine.

When operating the engine ON-OFF switch 61 to stop the engine, the solenoid 31 and the motor 43 are energized again. This disengages the plunger 32 from the second engaging notch 42, rotates the plate cam 41 in the direction indicated by arrow F2, and engages the plunger 32 with the first engaging notch 42. As a result, the rotations of the steering shaft 21 and the steering wheel (not shown) are prohibited.

Figure 7:
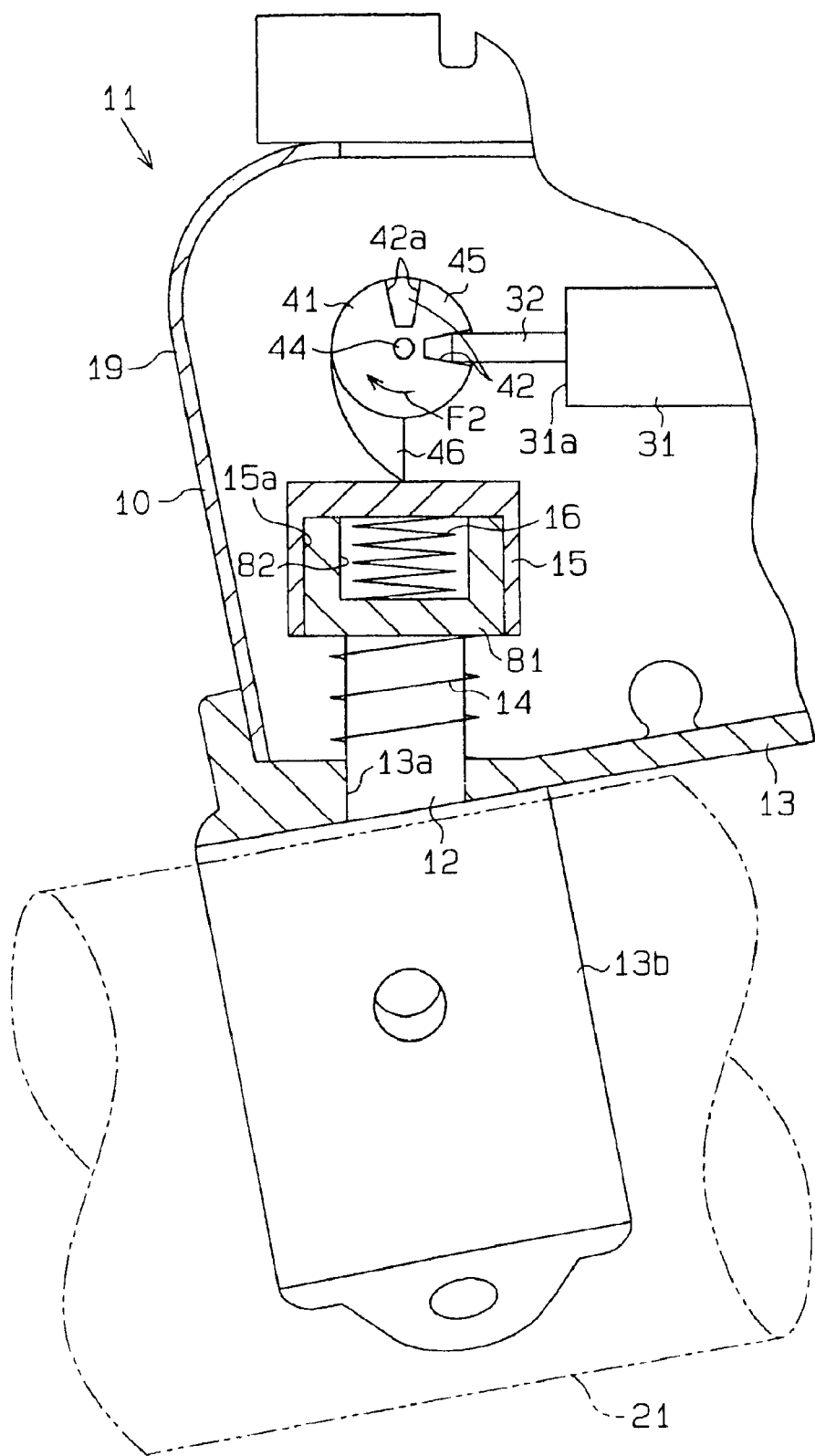
FIG. 7 is a cross-sectional view showing a main portion of an electronic steering wheel lock apparatus when a lock pin is engaged.

As shown in FIG. 7, the lock pin 12 may fail to engage the socket 22 when the engine stops in a state in which the steering wheel is rotated to a position differing from the neutral position. In this case, the pressing force of the plate cam 41 compresses the cam spring 16. In this state, when the steering shaft 21 is rotated such that the lock pin 12 engages the socket 22, the reaction force of the cam spring 16 engages the lock pin 12 with the socket 22.

The electronic steering wheel lock apparatus 11 according to the present embodiment has the advantages described below.

(1) The solenoid 31 remains engaged with the plate cam 41 to restrict movement of the plate cam 41 unless the engine ON-OFF switch 61 is operated. Therefore, when electric noise activates the motor 43 erroneously, the solenoid 31 restricts the movement of the plate cam 41. This prevents the lock pin 12 from being engaged with the socket 22 of the steering shaft 21 when not required and improves the reliability of the electronic steering wheel lock apparatus 11.

(2) The FET 62 is used to restrict the rotation of the second shaft 44 in only one direction. Therefore, the present embodiment requires only one FET 62. This simplifies the circuit configuration of the electronic steering wheel lock apparatus 11. As a result, the manufacturing cost of the electronic steering wheel lock apparatus 11 is reduced. Further, the simplification of the circuit reduces the frequency of failures that may occur in the electronic steering wheel lock apparatus 11.

(3) The plunger 32 is engaged with the notch 42 of the plate cam 41 to restrict the rotation of the plate cam 41 in a reliable manner. More specifically, the plunger 32 is engaged with the first engaging notch 42 in the locked state while the plunger 32 is engaged with the second engaging notch 42 in the unlocked state. This guarantees the positioning of the plate cam 41.

(4) The actuation of the solenoid 31 is hindered by operating the engine ON-OFF switch 61. This prevents the solenoid 31 from functioning erroneously.

(5) The solenoid 31 is located in the proximity of the plate cam 41. The plunger 32 projects towards the plate cam 41. The engaging notch 42 opens in the radial direction of the plate cam 41. That is, the engaging notch 42 is located at a relatively outer portion of the plate cam 41. Therefore, the plunger 32 restricts the rotation of the plate cam 41 with a relatively small force. This further guarantees the positioning of the plate cam 41.

(6) The engaging notches 42 become wider towards the opening ends. Therefore, the plunger 32 moves along the plate cam 41 and is easily guided into the engaging notches 42. This facilitates the engagement of the plunger 32 with the engaging notches 42.

The present embodiment may be modified as described below.

Figure 8:
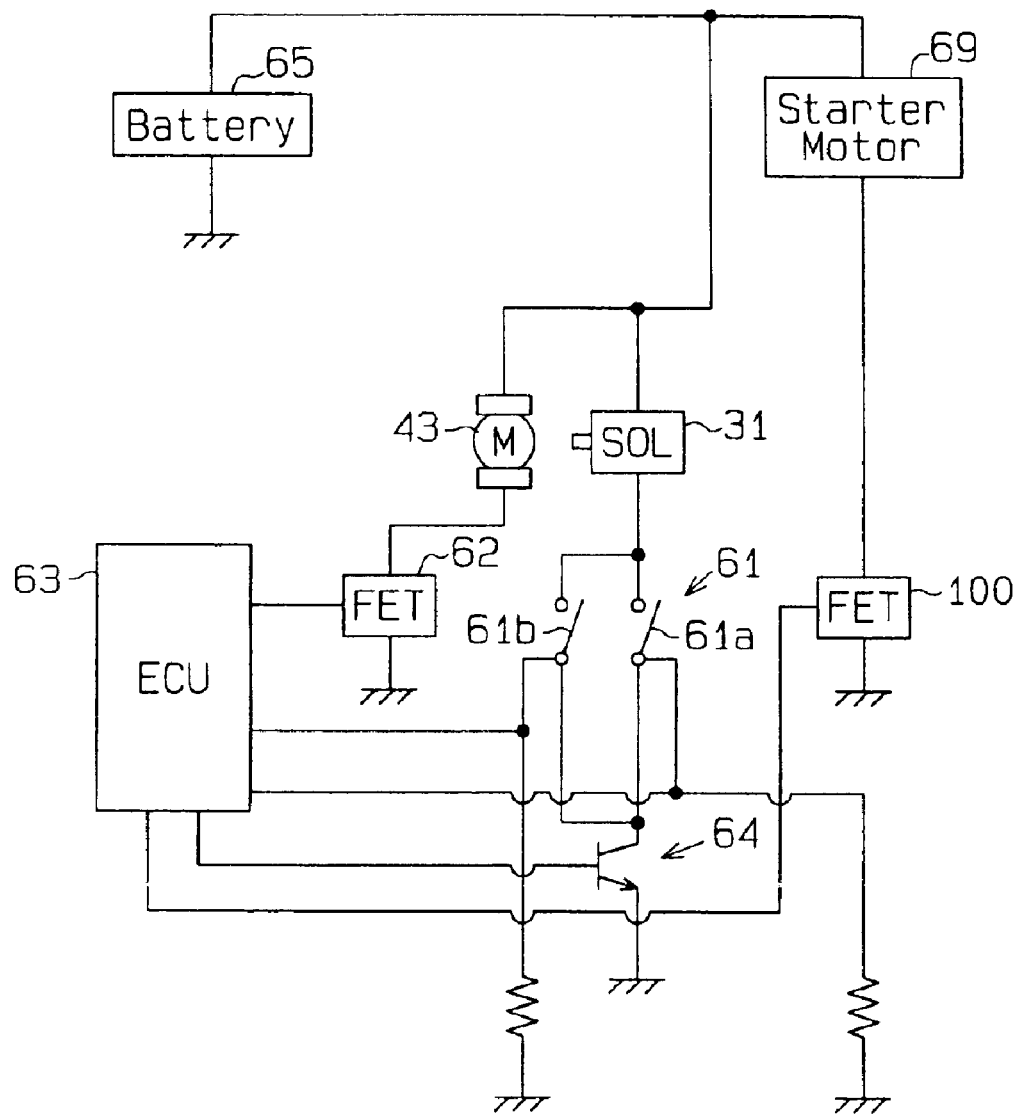
FIG. 8 is a schematic circuit diagram of an electronic steering wheel lock apparatus according to another embodiment of the present invention.
Figure 9:
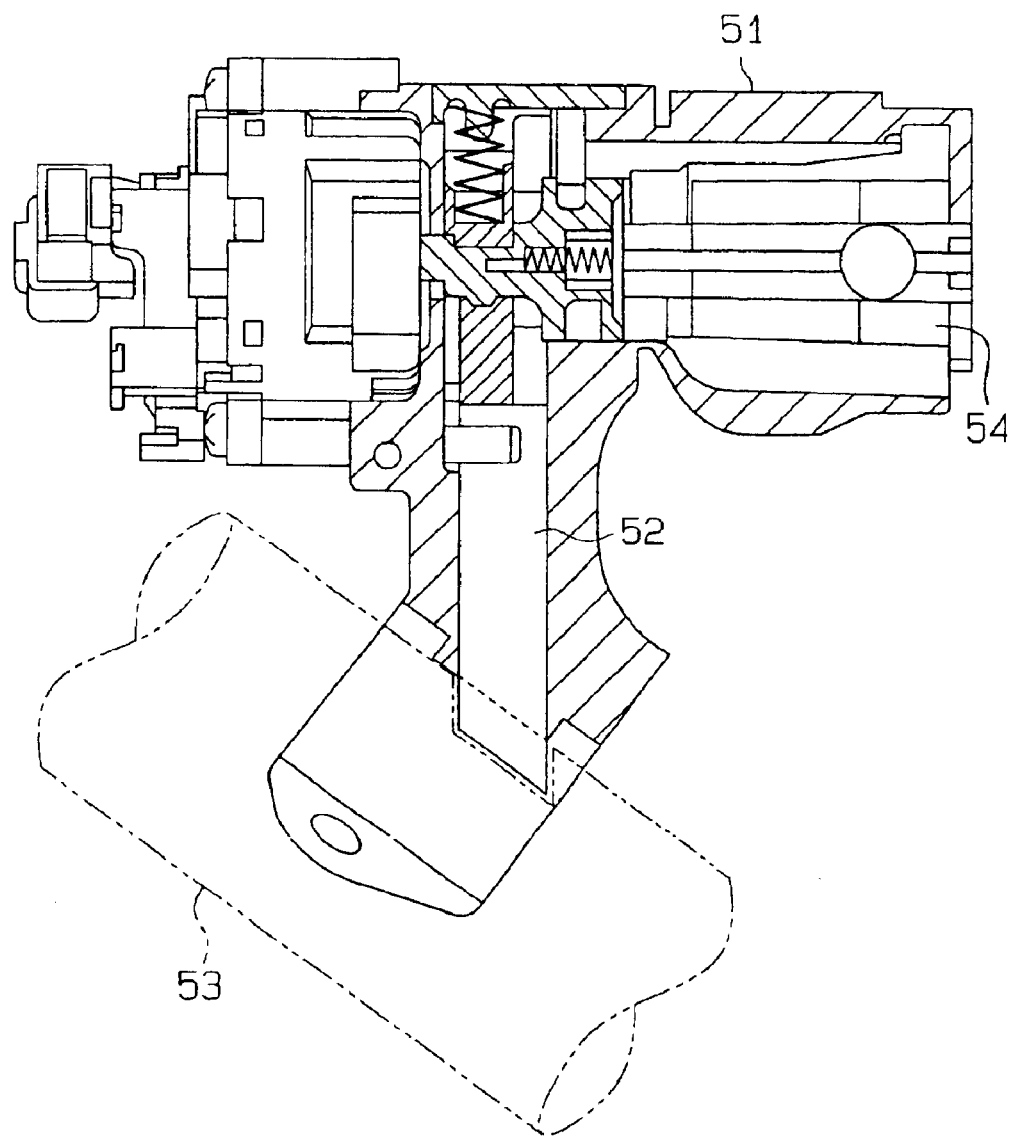
FIG. 9 is a cross-sectional view of a prior art steering wheel lock apparatus.

(a) Referring to FIG. 8, the engine ON-OFF switch 61 may be configured by an engine ON switch 61a and an engine OFF switch 61b. The switches 61a and 61b are connected to the ECU 63, and the ECU 63 recognizes the operation state of the switches.

(b) Other members, such as a rod, may be used in lieu of the plate cam 41. Other actuators, such as a solenoid and an air cylinder, may be used in lieu of the motor 43. Further, the plate cam 41 may be omitted and other actuators, such as a solenoid and an air cylinder, may be used in lieu of the motor 43.

(c) The plate cam 41 may be directly driven by the first shaft 47 of the motor 43.

(d) In lieu of the solenoid 31, actuators, such as an air cylinder, may be used.

(e) In lieu of the engaging notch 42, a friction portion having relatively large sliding resistance may be used to restrict the rotation of the plate cam 41 as the plunger 32 moves along the friction portion. An engaging projection, which is engaged with the plunger 32, may be arranged in lieu of the engaging notch 42. Further, a metal plate may be arranged in lieu of the engaging notch 42, and a magnet may be attached to the distal end of the plunger 32. In this state, the engaging notch 42 may be omitted.

(f) The plunger 32 may be engaged with the engaging notch 42 in a direction parallel to an axial direction of the second shaft 44. An engaging hole may be used in lieu of the engaging notch 42. Further, the engaging notch 42 may be arranged in the proximity of the second shaft 44.

(g) A transistor and an IC may be used in lieu of the FET 62.

(h) The ID codes may be checked through a transponder method in lieu of the smart ignition method. In the transponder method, a signal is transmitted when a key having an IC chip is inserted in a key cylinder.

What is claimed is:

1. A lock mechanism for a steering shaft and responsive to an operation of a starter in a vehicle, the lock mechanism comprising:
    a locking means for selectively locking the steering shaft;
    a first actuator for moving the locking means, wherein the first actuator includes a motor and a cam, wherein the cam is connected to the motor, contacts the locking means, and includes an engaging portion; and
    a second actuator for engaging the first actuator and restricting the movement of the first actuator, the second actuator being disengaged from the first actuator in response to the operation of the starter to enable the movement of the first actuator, wherein the engaging portion is engaged with the second actuator, and the second actuator includes a solenoid.

2. The lock mechanism according to claim 1, wherein the motor rotates in only one direction.

3. The lock mechanism according to claim 1, wherein the second actuator is connected to a power source via the starter.

4. The lock mechanism according to claim 2, wherein the locking means is movable between a lock position and an unlock position, the cam including a rotating portion, which contacts the locking means at the unlock position, and a stopper, which protrudes from the rotating portion and contacts the locking means at the lock position, and the engaging portion is an engaging notch extending in a radial direction of the rotating portion.

5. A lock mechanism for a steering shaft, the lock mechanism comprising:

a locking means for selectively locking a steering shaft;

an urging means for urging the locking means in a direction that releases the locking of the locking means;

a first actuator for moving the locking means against the force of the urging means; and a second actuator for engaging the first actuator and restricting the movement of the first actuator, the second actuator enabling the movement of the first actuator by disengaging the first actuator when the locking means unlocks the steering shaft.

6. A lock mechanism for a steering shaft, the lock mechanism comprising:

a locking means for selectively locking the steering shaft;

a first actuator for moving the locking means, wherein the first actuator includes a motor and a cam, wherein the cam is connected to the motor, contacts the locking means, and includes an engaging portion; and a second actuator for restricting the movement of the first actuator by engaging the first actuator when the locking means unlocks the steering shaft, wherein the engaging portion is engaged with the second actuator.

7. The lock mechanism according to claim 6, wherein the motor rotates in only one direction.

8. The lock mechanism according to claim 7, wherein the second actuator includes a solenoid, which engages the engaging portion.

9. The lock mechanism according to claim 6, wherein the lock mechanism is installed in a vehicle, the vehicle including a starter operated by a driver of the vehicle, and the second actuator is connected to a power source via the starter.

10. The lock mechanism according to claim 7, wherein the locking means is movable between a lock position and an unlock position, and the cam includes a rotating portion, which contacts the locking means at the lock position, and a stopper, which protrudes from the rotating portion and contacts the locking means at the lock position.

11. The lock mechanism according to claim 7, wherein the engaging portion is an engaging notch extending in a radial direction of the rotating portion.

* * * * *

UNITED STATES PATENT AND TRADEMARK OFFICE
CERTIFICATE OF CORRECTION

| | | |
|---|---|---|
| PATENT NO. | : 6,862,907 B2 | Page 1 of 1 |
| APPLICATION NO. | : 10/465991 | |
| DATED | : March 8, 2005 | |
| INVENTOR(S) | : Masaki Hayashi et al. | |

It is certified that error appears in the above-identified patent and that said Letters Patent is hereby corrected as shown below:

On the title page, item [54] and column 1, line 1:

<u>Title Page</u>
Item [54], after "STEERING" and before "LOCK", insert --WHEEL--.

Signed and Sealed this

Eighth Day of July, 2008

JON W. DUDAS
*Director of the United States Patent and Trademark Office*